United States Patent [19]

Struve, deceased et al.

[11] Patent Number: 4,727,678
[45] Date of Patent: Mar. 1, 1988

[54] HERBICIDE APPLICATOR WITH ADJUSTABLE SHIELD

[76] Inventors: Steve L. Struve, deceased, late of Friona; by Seva W. Struve, executrix, P.O. Box 909, Friona, both of Tex. 79035

[21] Appl. No.: 943,497

[22] Filed: Dec. 19, 1986

[51] Int. Cl.$^4$ .............................................. A01G 13/00
[52] U.S. Cl. ...................................................... 47/1.5
[58] Field of Search ................. 47/1.5, 1.7; 15/248 A; 400/200, 202; 118/213, 266, 267; 101/348

[56] References Cited

U.S. PATENT DOCUMENTS 4,219,964 9/1980 Dale ........................................ 47/1.5
4,254,529 3/1981 Cooke ................................ 15/248 A

*Primary Examiner*—Robert E. Bagwill
*Assistant Examiner*—Bradley M. Lewis
*Attorney, Agent, or Firm*—Fleit, Jacobson, Cohn & Price

[57] ABSTRACT

An elongated tubular handle is provided and closed at one end. The other end of the tubular handle has a tubular applicator body supported therefrom at generally 45° relative thereto by a tubular ell and the tubular body includes circumferentially and longitudinally spaced aperatures formed therethrough and an outer absorbent covering. Liquid herbicide may be carried in the handle and flow therefrom through the ell and into the tubular body through a flow restrictive orifice or aperature and tubular shield is snugly telescoped over the absorbent covering and frictional engagement therewith and is angularly displacable about the tubular body and includes a laterally opening window formed therein for exposing only a selected side of the absorbent covering carried by the tubular body.

7 Claims, 4 Drawing Figures

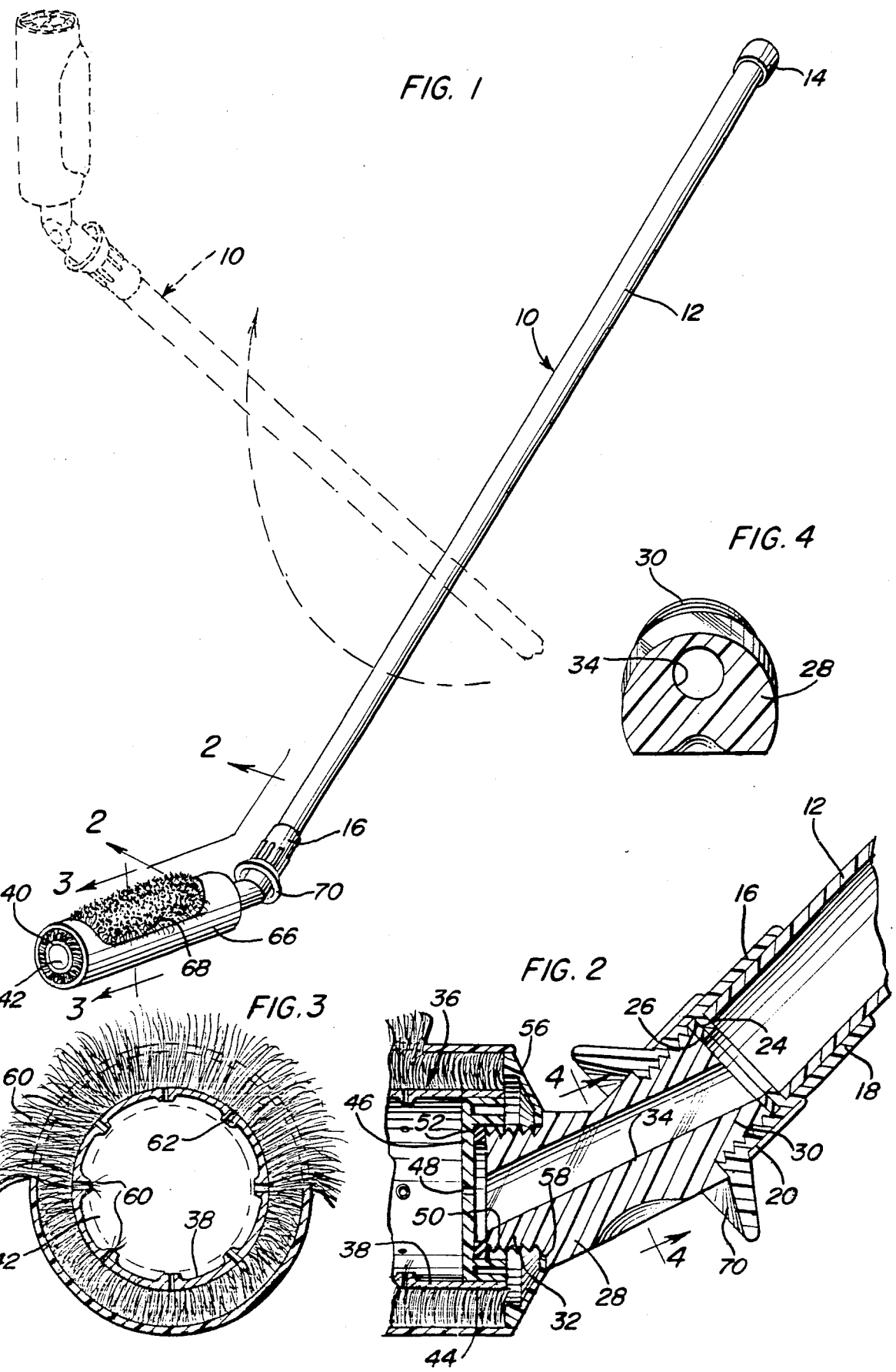

HERBICIDE APPLICATOR WITH ADJUSTABLE SHIELD

BACKGROUND OF THE INVENTION

1. Field of the Invention

This invention relates to a wand-type applicator wherein the free end of the wand includes an angulated elongated nap covered wick-type applicator structure. The applicator structure is hollow, selectively angularly adjustable about its longitudinal center axis relative to the wand and is supplied liquid herbicide from the interior of the wand portion of the applicator. A shield also is provided for removable securement over the applicator structure and functions to protectively cover selected sides of the applicator structure.

2. Description of Related Art

Various different forms of liquid herbicide applicators heretofore have been provided. In particular, a previously known form of herbicide applicator is disclosed in my prior U.S. application Ser. No. 110,364 (abandoned) and various other types of herbicide applicators of somewhat similar construction are disclosed in the prior patents made of record in my prior, abandoned application above referred to.

SUMMARY OF THE INVENTION

This invention has been specifically designed to provide structure whereby a work person riding mobile farm equipment may selectively apply liquid herbicide to occasional weeds and other unwanted vegetation as the mobile farm equipment moves through growing crops.

The main object of this invention is to provide a liquid applicator by which a person riding a piece of mobile farm equipment may occasionally efficiently apply liquid herbicide to selected unwanted vegetation as the farm equipment moves through farm crops.

Another object of this invention is to provide a liquid applicator for herbicides and which may be selectively adjusted to apply liquid herbicide to unwanted vegetation beneath desirable vegetation or unwanted vegetation projecting above desirable vegetation.

Still another important object of this invention is to provide a manual herbicide applicator constructed in a manner whereby liquid herbicide may be readily applied to occasional unwanted vegetation encountered by the operator of a piece of mobile farm equipment with little effort on the part of the operator and without excessive interference with the operator's task of operating the equipment.

Yet another object of this invention is to provide an herbicide applicator which may be conveniently shifted between operative and inoperative positions and which includes a liquid herbicide reservoir of substantial volume.

Another object of this invention is to provide an herbicide applicator which may be readily disassembled for cleaning.

A final object of this invention to be specifically enumerated herein is to provide an herbicide applicator in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of the construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the herbicide applicator of the instant invention illustrated in solid lines in an operative position and in phantom lines in an inoperative position;

FIG. 2 is an enlarged fragmentary vertical sectional view taken substantially upon the plane indicator by the section line 2—2 of FIG. 1;

FIG. 3 is a transverse vertical sectional view taken substantially by the plane indicator by the section line 3—3 of FIG. 1; and FIG. 4 is a transverse sectional view taken substantially upon the plane indicator by the section line 4—4 of FIG. 2.

DESCRIPTION OF THE PREFERRED EMBODIMENT

Referring now more specifically to the drawings, the numeral 10 generally designates the herbicide applicator of the instant invention. The applicator 10 is of the wand-type and includes an elongated tubular handle 12 closed at one end by an end cap 14. The end cap 14 may be removable, or it may be permanently attached to the corresponding end of the handle 12.

The end of the handle 12 remote from the end cap 14 includes a tubular fitting 16 having one end 18 telescoped over and secured to the end of the handle 12 remote from the end cap 14 and a second end 20 which projects endwise outwardly from the handle 12 and is internally threaded as at 22. The central longitudinal portion of the fitting 16 includes an inwardly projecting radial shoulder 24 against the outer side of which a sealing washer 26 is abutted.

A 45° ell 28 is provided and includes identical first and second externally threaded ends 30 and 32. Either end 30, 32 is removably threadingly securable within the second end 20 of the tubular fitting 16 to a position with the sealing washer 26 tightly compressed between that ell end and the shoulder 24. In addition, the ell 28 includes a passage 34 extending therethrough.

The applicator 10 includes elongated applicator structure 36. The applicator structure 36 includes a tubular body 38 constructed of plastic or other suitable noncorrosive material and the body 38 includes a first end 40 closed by an imperforate end wall 42 secured therein. The body 38 also includes a second end 44 in which a flow controlled disk 46 is sealingly secured, the disk 46 extending across the second end 32 and having a small diameter flow aperture 48 formed therein. The disk 46 defines and end wise outwardly opening internally threaded socket 50 in which a sealing washer 52 corresponding to the washer 26 is seated and the second end 32 of the ell 28 is threaded into the socket and compressively engages the washer 52 between the second end 32 of the ell 28 and the opposing annular area of the flow controlling disk 46. In addition, a cup-shaped annular shield 56 is disposed on the second end 32 and abuts an annular should 58 defined on the second end 32.

The tubular body 38 comprises a section of paint roller and includes an outer nap covering 60. The tubular body is forceably perforated by radial inward penetration by pointed instruments from the outside thereof in order to form a plurality of longitudinally spaced zones of circumferentially spaced apertures 62 through the tubular body 38. The apertures 62 are formed by penetration of a sharp pointed instrument from the exterior of the tubular body 38 in order that portions of the nap 60 may be deflected inwardly of the apertures 62.

The applicator 10 additionally includes a hollow open ended cylindrical shield or sleeve 66 which is snuggly receivable over the nap 60 and the tubular body 38. The shield 66 includes a window 68 formed in one side thereof and is angularly displacable about the applicator structure 36, but is somewhat tightly engaged with the nap 60 thereon in order to be frictionally retained in adjusted angular position on the applicator structure 36.

The threads on the opposite ends of the ell 28 are such that one side of the applicator structure 36 faces toward the included angle defined between the applicator structure 36 and the handle 12 when the first end 30 of the ell 28 is threaded into the fitting 16 and the second end 32 of the ell 28 is threaded into the socket 60 and the opposite side of the applicator structure 36 faces toward the included angle defined between the applicator structure 36 and the handle 12 when the second end 32 of the ell 28 is threaded into the fitting 16 and the first end 30 of the ell 28 is threaded into the socket 50. Accordingly, alternate sides of the applicator structure 36 may be brought into play, depending upon the manner in which the herbicide applicator 10 is to be used. Additionally, in as much as the shield 66 is angularly displacable about the applicator structure 36, selected sides of the applicator structure 36 may be exposed for herbicide applying operations while the opposite side of the applicator structure 36 remains covered.

The ell 28 is constructed of transparent material in order that the presence or nonpresence of liquid herbicide within the passage 34 may be determined when the applicator 10 is held in the position thereof illustrated in solid lines in FIG. 1 may be readily determined.

In operation, the handle 12 may be unthreaded from the fitting 16 and filled with the desired liquid herbicide. Then, the handle 12 again may be threaded onto the fitting 28. When the applicator 10 is in the phantom line position thereof illustrated in FIG. 1, any liquid herbicide within the applicator structure 36 will drain therefrom through the aperture 48, the ell 28 and back end of the handle 12. However, when it is desired to apply liquid applicator to unwanted vegetation, the applicator 10 is swung from the phantom line position of FIG. 1 to the solid line position illustrated in FIG. 1. Swinging from the phantom line position to the solid position requires only a 90° angular displacement of the handle 12. This automatically swings the applicator structure 36 from an upstanding herbicide draining position to a horizontal herbicide applying position. When the applicator 10 is in the solid line position of FIG. 1, liquid herbicide flows from the handle 12, through the passage and the aperture 48 into the interior of the tubular body 38 and through the lower aperture 62 into the nap 60. If the nap 60 begins to become overly saturated, the applicator 10 is swung back to the phantom line position for sufficient time to allow excess liquid herbicide within the tubular body 38 to flow back into the handle 12.

The shield 60 may be angularly displaced about the applicator structure 36 as desired to best facilitate the application of liquid herbicide to unwanted vegetation. When the window 68 opens downwardly, unwanted vegetation beneath the leaves of desirable vegetation may be treated with liquid herbicide while the undersides of the leaves of the desirable vegetation are protected by the closed upper portion of the sleeve 66.

Should the nap 60 become worn on one side of the tubular body 38, the handle 12 and applicator structure 36 may be removed from the ell 28 and the latter may be reversed in position. When the applicator structure is threaded onto the other end of the ell 28, the side remote from the worn side of the nap 60 will be exposed where the worn side previously was exposed.

The annular shield 56 prevents excess herbicide in the nap 60 from flowing from the applicator structure 36, over the ell 28 and down along the handle 12 when the applicator 10 is in the phantom line position thereof illustrated in FIG. 1. Any liquid herbicide caught by the shield 56 is returned by the nap layer whenever the applicator 10 is returned to the solid line position thereof illustrated in FIG. 1. Further, it will be noted that the fitting 16 includes an integral funnel 70 to facilitate pouring liquid herbicide into the handle 12 when the ell 28 has been removed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new as follows:

1. An herbicide applicator including an elongated tubular handle having first and second ends and means closing said first end,
   an elongated tubular body having first and second ends and closed at its first end,
   liquid conduit means removably mounting the second end of said tubular body from said second end of said handle for angular adjustment of said tubular body about its longitudinal center axis relative to said handle and communicating the interiors of said handle and tubular body for closed liquid flow from the interior of said handle into the interior of said tubular body,
   said tubular body having a plurality of circumferentially and longitudinally spaced aperatures formed therethrough communicating the inner surface of said tubular body with the outer surface thereof,
   said outer surface including a liquid absorbent covering,
   a generally cup-shaped annular shield mounted from said liquid conduit means and closely adjacent and opening toward said second end of said tubular body, and
   a tubular sleeve snugly telescoped over said tubular body and said absorbent covering and having a window formed in one side thereof for exposing said absorbent covering through said window,
   said sleeve being adjustably rotatable about said tubular body for exposing different sides of said absorbent covering through said window,
   said sleeve being frictionally engaged with said absorbent covering for frictional retention of the angularly adjusted position of said sleeve on said absorbent covering,
   said liquid conduit means mounting said second end of said tubular body from said handle in position with said tubular body inclined approximately 45° relative to said handle.

2. The liquid applicator of claim 1, wherein said liquid conduit means comprises a generally 45° ell from whose opposite ends said handle and tubular body are removably supported.

3. The applicator of claim 2, wherein said ell is constructed of transparent material for viewing the presence or nonpresence of liquid herbicide therein from the exterior thereof.

4. The liquid applicator of claim 2, wherein said ell is threadedly engaged with said handle and said second end of said tubular body and said handle and tubular body are selectively threadedly engagable on opposite ends of said ell, the threads on the opposite ends of said ell being such that threaded securement of said tubular body on one end of said ell will position one side of said absorbed covering in one direction relative to said handle and the threaded securement of said tubular body on the other end of said ell will position the remote side of said absorbent covering in said one direction relative to said handle.

5. The applicator of claim 4, wherein said ell is constructed of transparent material for viewing the presence or nonpresence of liquid herbicide therein from the exterior thereof.

6. The applicator of claim 1, including an annular cup-shaped shield supported closely adjacent and opposing said second end of said tubular body.

7. The applicator of claim 6, wherein the end of said tubular sleeve adjacent said annular shield is snuggly telescopingly engagable thereover.

* * * * *